(12) United States Patent
Hyland, Jr. et al.

(10) Patent No.: US 6,969,475 B2
(45) Date of Patent: Nov. 29, 2005

(54) PHOTOLUMINESCENT ALKALINE EARTH ALUMINATE AND METHOD FOR MAKING THE SAME

(75) Inventors: Robert W. Hyland, Jr., Oakmont, PA (US); James P. Quintenz, Henderson, KY (US); Brian Tyler Dunville, Sebree, KY (US); Gowri Subrahmanyam, Kingston (CA)

(73) Assignee: KB Alloys, Robards, KY (US)

( * ) Notice: Subject to any disclaimer, the term of this patent is extended or adjusted under 35 U.S.C. 154(b) by 0 days.

(21) Appl. No.: 10/717,106

(22) Filed: Nov. 19, 2003

(65) Prior Publication Data

US 2004/0135122 A1 Jul. 15, 2004

Related U.S. Application Data

(60) Provisional application No. 60/428,380, filed on Nov. 22, 2002.

(51) Int. Cl.[7] ......................... C09K 11/64; C09K 11/54
(52) U.S. Cl. ............................................. 252/301.4 R
(58) Field of Search ................................. 252/301.4 R

(56) References Cited

U.S. PATENT DOCUMENTS

| | | |
|---|---|---|
| 3,294,699 A | 12/1966 | Lange |
| 3,502,592 A * | 3/1970 | Amster ................ 252/301.4 R |
| 3,595,802 A | 7/1971 | Blasse |
| 4,216,408 A | 8/1980 | Verstegen et al. |
| 4,524,300 A | 6/1985 | Rutten et al. |
| 4,644,223 A | 2/1987 | de Hair et al. |
| 4,795,588 A | 1/1989 | Pet et al. |
| 4,806,825 A | 2/1989 | Catherall et al. |
| 5,273,681 A | 12/1993 | Srivastava |
| 5,376,303 A | 12/1994 | Royce et al. |
| 5,424,006 A * | 6/1995 | Murayama et al. ... 252/301.4 R |
| 5,644,193 A | 7/1997 | Matsuda et al. |
| 5,686,022 A | 11/1997 | Murayama et al. |
| 5,698,301 A | 12/1997 | Yonetani |
| 5,770,111 A | 6/1998 | Moriyama et al. |
| 5,811,174 A | 9/1998 | Murakami |
| 5,879,586 A | 3/1999 | Kitamura et al. |
| 5,885,483 A | 3/1999 | Hao et al. |
| 6,010,644 A * | 1/2000 | Fu et al. ................ 252/301.4 R |
| 6,117,362 A * | 9/2000 | Yen et al. ............. 252/301.4 R |
| 6,136,226 A | 10/2000 | Sakai |

(Continued)

FOREIGN PATENT DOCUMENTS

EP   0 094 132   11/1983

(Continued)

OTHER PUBLICATIONS

Kinzo Nonomura, Hidetaka Higashino, and Ryuichi Murai, "Plasma Display Materials," MRS Bulletin, Nov. 2002, pp. 898-902.

*Primary Examiner*—C. Melissa Koslow
(74) *Attorney, Agent, or Firm*—Buchanan Ingersoll PC

(57) ABSTRACT

A photoluminescent phosphorescent material for emergency lighting and the like. An alkaline earth aluminate base material is alloyed with a lanthamide earth element and a transition metal element. When exposed to ambient lighting, the material of the present invention emits light in dark areas even after the loss of electrical power. The addition of a transition metal element such as Scandium (Sc) provides longer and brighter photoluminescence than is expected by the use of a lanthanide element alone.

3 Claims, 4 Drawing Sheets

U.S. PATENT DOCUMENTS

| | | |
|---|---|---|
| 6,177,029 B1 | 1/2001 | Kaz et al. |
| 6,261,477 B1 * | 7/2001 | Fu et al. ................ 252/301.4 R |
| 6,267,911 B1 * | 7/2001 | Yen et al. .............. 252/301.4 R |
| 6,280,655 B1 | 8/2001 | Xu et al. |

FOREIGN PATENT DOCUMENTS

| | | |
|---|---|---|
| EP | 94132 | * 11/1983 |
| JP | 56-152883 | 11/1981 |

* cited by examiner

PHOTOLUMINESCENT ALKALINE EARTH ALUMINATE AND METHOD FOR MAKING THE SAME

This Application claims priority from Provisional Patent Ser. No. 60/428,380 filed Nov. 22, 2002.

BACKGROUND OF THE INVENTION

1. Field of the Invention

The present invention relates to a phosphorescent material, and more particularly to a photoluminescent phosphorescent material containing an alkaline earth aluminate and method for making the same.

2. Description of the Prior Art

Photoluminescent materials are well known in the art. They provide substance in material whereby items "glow in the dark" after having been exposed to light, either natural or artificial. These items range in use from watch faces, novelty items and the like to safety features such as lighted exit signs. An important feature of such materials is their decay time, or resident time that will remain luminescent and visible when the surroundings that the material is used in become dark.

In recent years, it has become important to use such materials in exit way lighting, such that an emergency exit way can remain lighted even after electrical power has been cut. With this type of material, the exit lighting absorbs light energy or radiation from the ambient lighting within a stairwell, for example, and can remain photoluminescent for long periods of time after the electricity has been cut. Very bright materials generally comprise phosphorescent materials such that the ambient light that they provide is very bright for an extended period of time, such as 12–24 hours.

Historically, there has been considerable commercial interest in the optical properties of rare earth activated alkaline earth (AE) aluminates due to their suitability in a variety of applications. Significant growth has taken place in markets such as opto-electronics, telecommunications and optically active commercial products including architectural lighting, building products and way-finding systems. With respect to the applications in the artificial lighting and illuminated display technology areas, AE aluminate materials have recently become important due to their greatly improved persistent photoluminescence properties relative to existing phosphors based on zinc sulfide (ZnS) and related phosphors. Among the most actively studied and commercially useful aluminates are those based on the system $SrO—Al_2O_3$, in which a number of stoichiometric oxide compounds are formed and remain stable at room temperature. Several of these oxide phases become optically active when doped with certain rare earth metals (REM's). The optical emission is attributable to the modifications of the electronic structure that arise relative to the non-doped host aluminate crystal.

Of particular importance in the phenomenon of persistent afterglow phosphorescence or photoluminescence are the strontium aluminates that are activated with small amounts of rare earth-containing oxides and compounds. Very early work indicated that persistent photoluminescence was obtained by adding 2–8 mole percent $Eu_2O_3$ to an equimolar mixture of strontium carbonate ($SrCO_3$) and aluminum hydroxide $Al(OH)_3$. Subsequent work near the composition $SrAl_2O_4$ extended the concept of Europium additions to include all other rare earth metals (REM) including Dy, La, Ce, Pr, Nd, Sm, Gd, Tb, Ho, Er, Tm, Yb, and Lu.

It has become common practice to chemically identify optically active inorganic materials such as the AE aluminates that have been doped by indicating the stoichiometry of the oxide phase followed by the dopant chemical identity. Thus, the above-mentioned materials are denoted in the literature as $SrAl_2O_4$:Eu,Dy or $SrAl_2O_4$:Eu,Dy,Pr, etc. Where indicated, these additional dopants serve as co-activators and in certain specific formulations they have been found to enhance the photoluminescence behavior of the base Eu activated strontium aluminate or $SrAl_2O_4$:Eu and several other Sr aluminates.

The precise quantum mechanical mechanisms that govern this behavior in the AE aluminates have not been completely and unambiguously identified at this time. However, there is sufficient experimental and theoretical evidence to indicate that the process of electron/hole trapping of photostimulated carriers due to the presence of dopant species gives rise to the long decay time phosphorescence observed in these materials.

For example, the photoemission extinction time that marks the cessation of afterglow phosphorescence was found to increase by a factor of 10 to 15 for $SrAl_2O_4$ that is co-doped with about 1.5 mol % of Eu and Dy or Eu and one ore more of the rare earth elements mentioned above. The extinction time is commonly defined as the time required for the afterglow photoemission to diminish to 0.032 millicandela per square meter ($mcd/m^2$). This value, though somewhat arbitrary, is approximately 100 times the commonly accepted limiting light intensity that can be detected by the human eye.

SUMMARY OF THE INVENTION

It has been discovered that small additions of Scandium (Sc) in the form of $Sc_2O_3$ incorporated as a ternary or quaternary co-activator to $SrAl_2O_4$:Eu,Dy,REM result in a photoluminescent oxide material that possesses an improved persistent afterglow intensity relative to both traditional ZnS and certain formulations of strontium aluminate such as $SrAl_2O_4$:Eu,Dy at long extinction times (in the range 1–3 hours after optical excitation). Persistent phosphorescence may also be obtained in applying the invention to other Eu and Dy doped oxide compositions within the $SrO—Al_2O_3$ system such as $SrAl_4O_7$:Eu,Dy, $SrAl_{12}O_{19}$:Eu,Dy, $Sr_4A_{14}O_{25}$, and mixtures thereof.

Also disclosed is a method for preparing the scandium containing photoluminescent material using standard processing techniques. The useful range of $Sc_2O_3$ additions has been found by experiment to vary from about 0.01 to about 3.0 mole percent in $SrAl_2O_4$ that has been doped with $Eu_2O_3$ and $Dy_2O_3$ or with $Eu_2O_3$, $Dy_2O_3$ and one other REM oxide. The example embodiments of the present invention discussed herein refer to $SrAl_2O_4$:Eu,Dy based phosphors whose total dopant concentration is in the range of 0.6 to 10 mole percent.

BRIEF DESCRIPTION OF THE DRAWINGS

Various other objects features and advantages of the invention will be readily apparent according to the following description exemplified by the drawings, which are shown by way of example only, wherein.

DESCRIPTION OF THE PREFERRED EMBODIMENTS

Figure 1:
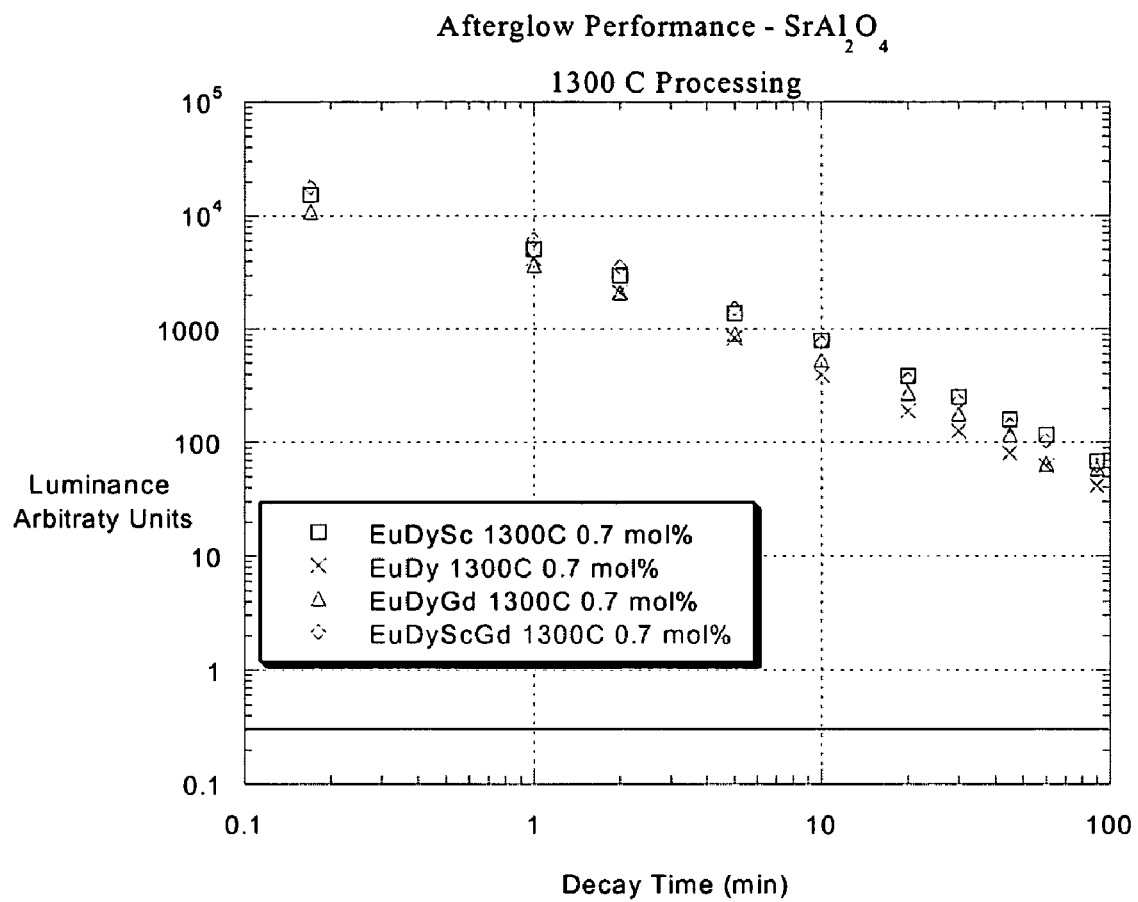
FIG. 1 is a graph showing the afterglow performance according to a first embodiment of manufacturing the invention.

The present invention provides an improved photoluminescent phosphor based on the alkaline earth aluminates. Examples of the new phosphor include $SrAl_2O_4$:Eu,Dy doped with Sc (via incorporation of $Sc_2O_3$), $SrAl_2O_4$:Eu, Dy,Gd doped with Sc, $SrAl_4O_7$:Eu,Dy doped with Sc and $Sr_4Al_{14}O_{25}$:Eu doped with Sc. Improvements in the long time persistent afterglow characteristics of the photoluminescent material are achieved by undertaking various doping or co-doping procedures that involve the use of scandium oxide or other scandium containing feedstocks (such as chlorides or fluorides of Sc) in combination with rare earth containing oxides or feedstocks. Examples based on Eu, Dy, and Gd are provided, but the invention is applicable to all rare earth additions mentioned above. In practice, acceptable performance improvements are obtained by adding Sc in the form of $Sc_2O_3$ to the above mentioned strontium aluminates in the range of 0.01 to about 3.0 mole percent. Although the present invention is discussed as having a base material comprising strontium (Sr), it will be understood by those skilled in the art that similar base elements may be utilized, such as barium, magnesium, calcium or any combinations thereof In general, oxide phosphor materials synthesized using this invention can demonstrate enhanced photoluminescence intensity and/or improved long time persistence of the afterglow photoemission when Sc is added as noted above. For many applications involving phosphorescent pigments, paints and related product forms, long persistence times are preferred especially in the areas of way-finding and emergency exit/egress signage. The enhancement of the intensity of photoluminance during periods of power failure and darkness is desirable in order to meet or exceed existing regulations and specifications for these materials.

Without intending to be bound to any particular theory or hypothesis, it is believed that the incorporation of Sc into the strontium aluminate phosphor, in combination with the REM activators defined previously, results in the development of more efficient and/or more numerous traps or trapping centers for photostimulated electrons and holes. It is believed that an increase in the efficiency and number of such defects leads to a higher time dependent carrier density and therefore a more pronounced afterglow intensity during the process of radiative recombination of the electrons and holes during the decay period.

The alkaline earth aluminates of the present invention can be manufactured by standard powder processing techniques. In the most general method, the photoluminescent product is synthesized by combining the strontium oxide or carbonate, aluminum oxide, fluoride or hydroxide, activator oxides or feedstocks including those of Eu, Dy, Gd, and Sc and, if desired, a flux material. The flux is generally a boron containing oxide or hydroxide such as anhydrous boric acid $(B_2O_3)$ or $(H_3BO_3)$ and its primary role is to improve the reactivity between the strontium and aluminum feedstocks, which leads to the formation of the basic strontium aluminate phase of interest.

It is accepted and standard practice to combine the phosphor components, usually in the form of dry powders, by mixing the components in a mechanical blender or mixing mill in order to obtain a homogeneous dispersion. Usually the strontium aluminate components are mixed at the stoichiometric compositions indicated above, but some deviation (in the range of 1 to 5%) from the exact proportions is permissible and degradation of the photoluminescent performance is not observable. It is also noted that in the practice of the present invention that the strontium carbonate component typically contains minor amounts of barium (Ba), magnesium (Mg) and calcium (Ca). These impurities are typically inherited into the final strontium aluminate crystal structure. However, their presence does not result in appreciable degradation or alteration of the persistent phosphorescence of the final material.

EXAMPLES

In one application of the present invention to produce $SrAl_2O_4$:Eu,Dy,Gd,Sc the following materials and quantities were combined in a powder mixer:
$SrCO_3$ (1.0 mole)
$Al_2O_3$ (1.0 mole)
$Eu_2O_3$ (0.005 mole)
$Dy_2O_3$ (0.01 mole)
$Gd_2O_3$ (0.005 mole)
$Sc_2O_3$ (0.005 mole)
$B_2O_3$ (0.2 mole).

The powdered materials are then agitated for several minutes in a blending vessel in order to achieve a uniform powder mixture. Subsequent to mixing the powder is loaded into a pelletizing press and isostatically compacted under a pressure of 25,000 psi. The powder pellets are then loaded into a circulating air furnace at a temperature below about 250° C. until a uniform temperature is achieved. The pellets are then heated to a temperature above 800° C. in a circulating air furnace for a period of 4 to 8 hours in order to permit calcination of the strontium carbonate followed by formation of the strontium aluminate according to the intended stoichiometric reaction. An example reaction is:

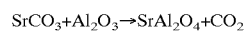

$$SrCO_3 + Al_2O_3 \rightarrow SrAl_2O_4 + CO_2$$

Subsequent to this reaction sintering step, the sintered material is optionally crushed or milled to an intermediate powder form of 120 mesh and then re-pelletized according to the procedure described above. However, in cases where the initial pellets possess a high surface to volume ratio the re-crushing step may not be necessary. The powder or pellets are then heated to a temperature between 1100° C. and 1350° C. for a period of 2 to 6 hours in a flowing gaseous atmosphere of $N_2$–5% $H_2$. This final heat treatment is performed in order to fix the valence state of the Eu coactivator to $Eu^{2+}$. In yet another application to produce strontium aluminate phases by the present invention, it is permissible to mix the precursor oxide materials comprising strontium carbonate, alumina, anhydrous boric acid, rare earth and scandium oxide phases in a dry media ball mill for one to several hours. The action of the ball mill serves to homogenize and refine the individual oxide phase particle sizes to an extent that permits the calcination and strontium aluminate synthesis steps to be combined into a single process. In practicing the invention by this method, it is found that a heating rate of between 100° C. to 200° C. per hour to the reaction temperature is sufficient for achieving the complete reaction and synthesis of the strontium aluminate phosphor. It is generally believed that Dy maintains a valence state of $Dy^{3+}$ subsequent to this treatment as do the other REM coactivators such as Gd, La, Nd, etc., when present. It is further believed that Sc undergoes an ionization step to produce a $Sc^{3+}$ ion when the strontium aluminate is treated according to the above methods.

Figure 2:
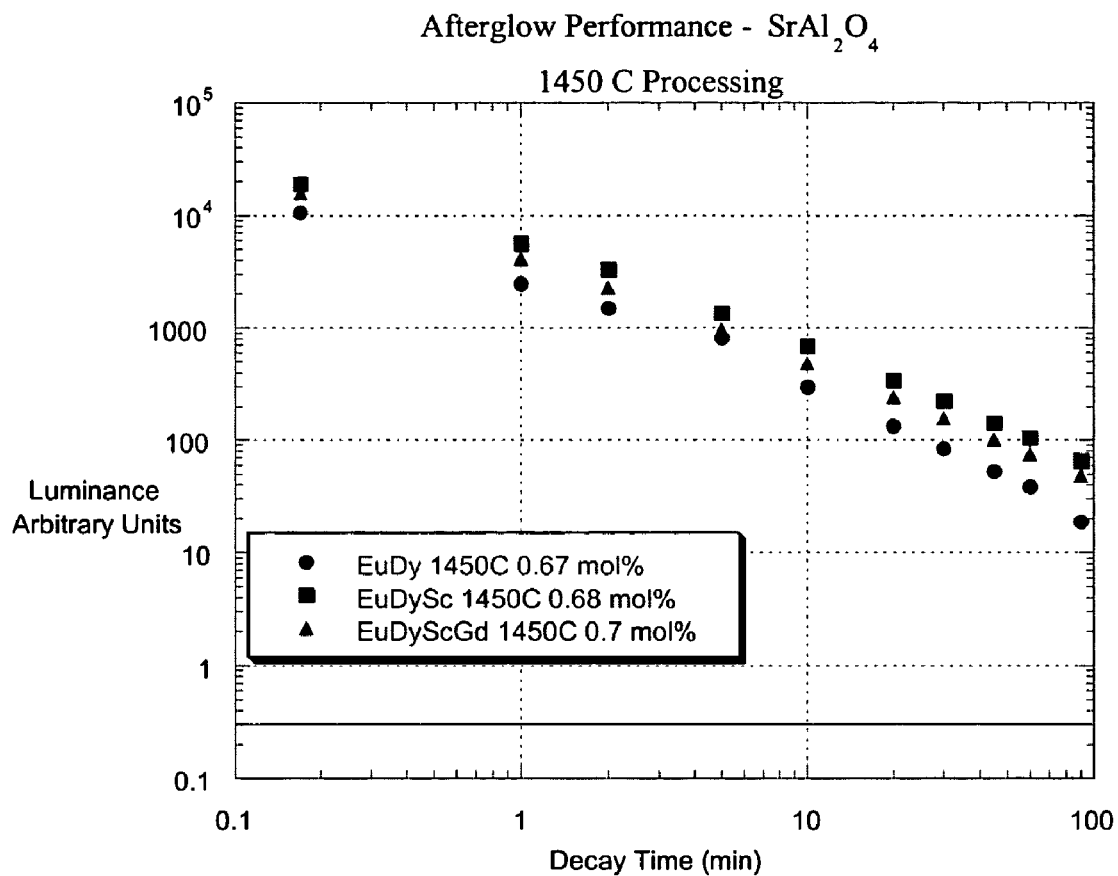
FIG. 2 shows the afterglow characteristics according to a different methodology for manufacturing an embodiment of the present invention.

As shown in FIG. 1, the afterglow characteristics of this type of composition, with and without scandium, are compared. In FIG. 1 the strontium aluminate base material was synthesized at approximately 1300° C. and subsequently exposed to ultraviolet excitation for about five (5) minutes, wherein it was synthesized at approximately 1450° C. in FIG. 2. The solid horizontal line in all of the Figures represents the commonly accepted light detection limit for the human eye under frilly dark-adapted conditions. As can clearly be seen the luminescence of the materials containing scandium are higher than for those formulations without scandium.

A second application of the invention involves the synthesis of $Sr_4Al_{14}O_{25}:Eu,Dy,Sc$ and $Sr_4Al_{14}O_{25}:Eu,Sc$ according to the method described above wherein the following components are combined according to the reaction:

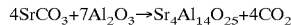
$$4SrCO_3 + 7Al_2O_3 \rightarrow Sr_4Al_{14}O_{25} + 4CO_2$$

in which the following proportions of example feedstocks were utilized:
$SrCO_3$ (4.0 mole)
$Al_2O_3$ (7.0 mole)
$Eu_2O_3$ (0.005 mole)
$Dy_2O_3$ (0.01 mole)
$Sc_2O_3$ (0.005 mole)
$B_2O_3$ (0.2 mole).

Figure 3:
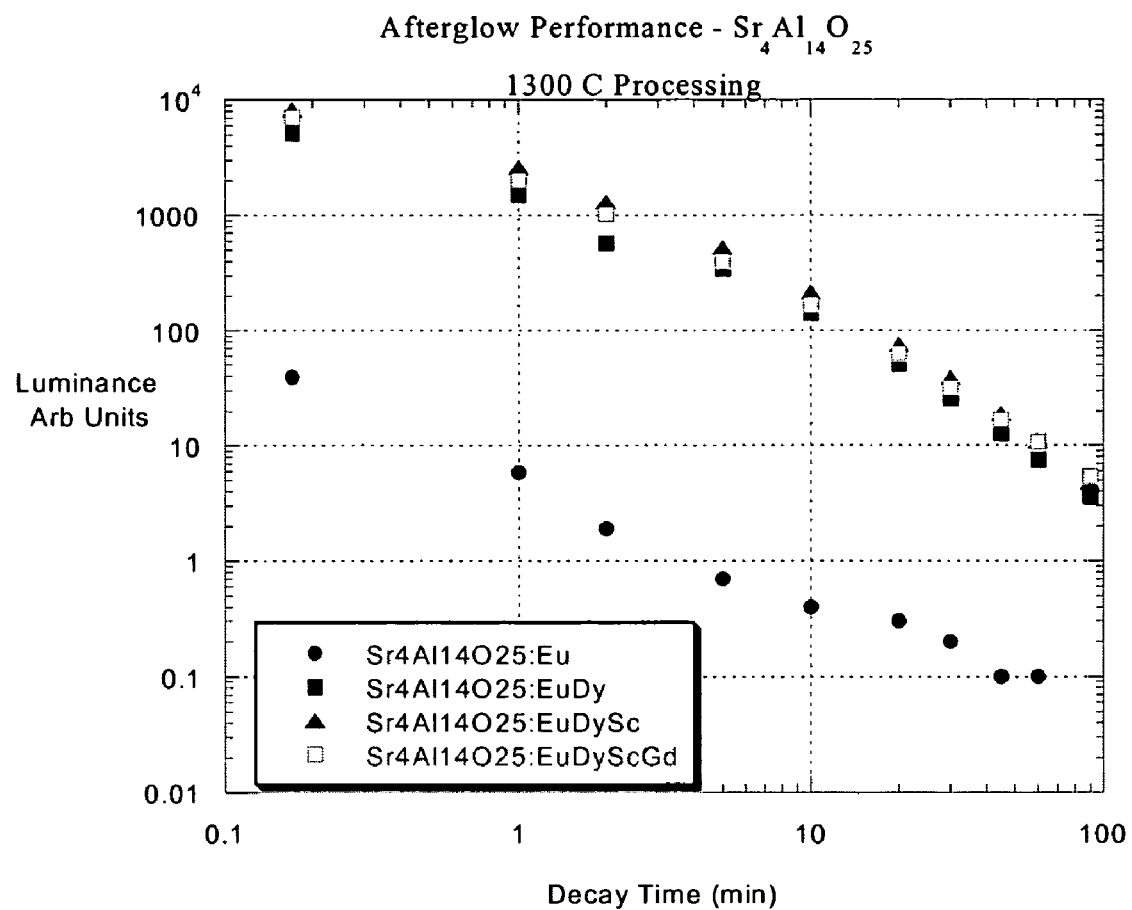
FIG. 3 is a graph showing the afterglow performance according to a second embodiment of manufacturing the invention.

FIG. 3 shows the photoluminescence performance of this material both with and without scandium. The strontium aluminate base material was synthesized at approximately 1300° C. Again, those formulations containing scandium have superior performance compared to those without it.

Figure 4:
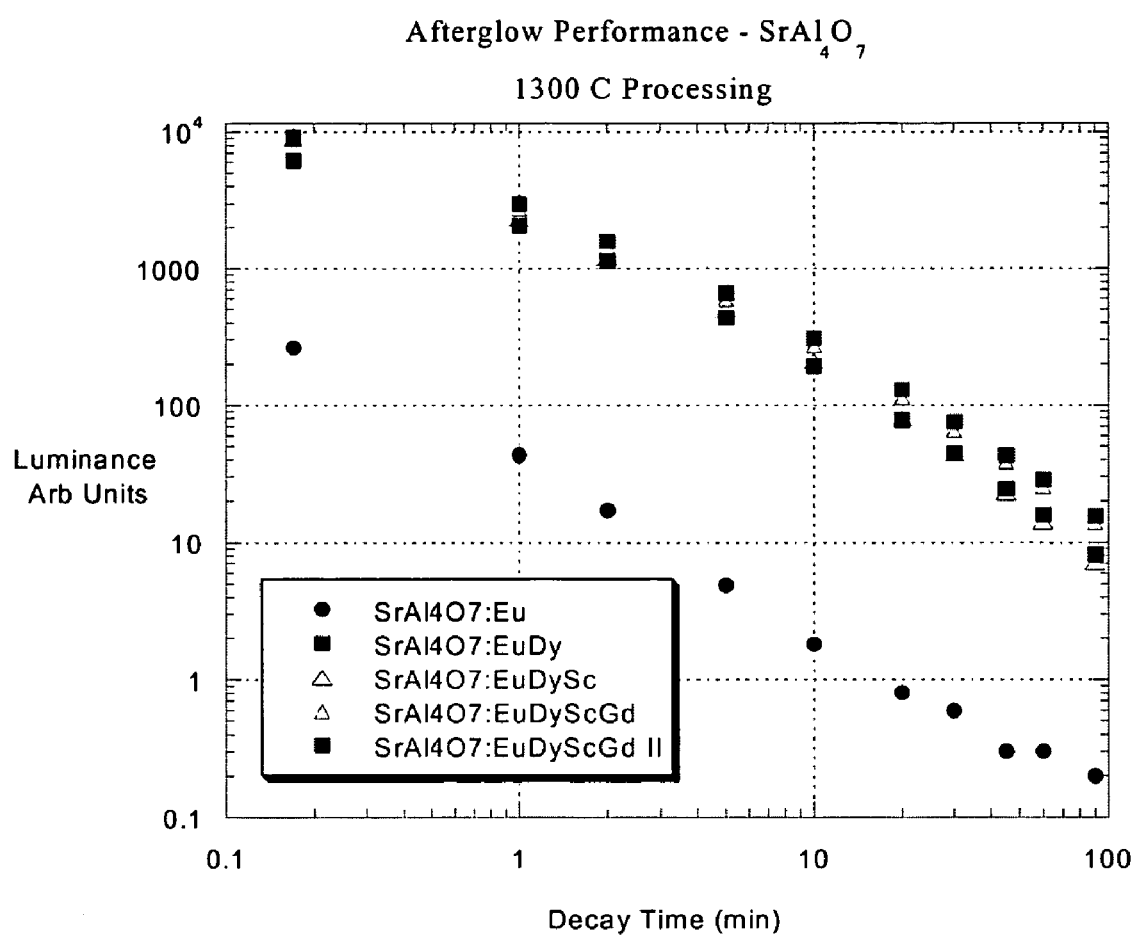
FIG. 4 is a graph comparing afterglow characteristics of a third formulation mixed with and without scandium.

FIG. 4 shows a further embodiment of the present invention wherein the base material has a composition of $SrAl_4O_7$. It shows similar superior performance characteristics when scandium is added.

As shown herein, photoluminescent compositions having scandium exhibit superior characteristics when compared to conventional compositions based on strontium aluminate having lanthanide elements such as europium (Eu) and dysprosium (Dy) activators and/or coactivators. When the phosphor performance is viewed at a constant total mole fraction of added activators and coactivators, replacing a portion of the Eu+Dy elements with scandium (or even Sc+gadolinium (Gd)) improves the performance relative to the same overall addition of just Eu+Dy. Hence, a transition metal element such as scandium provides an essential component leading to improved persistent phosphorescence and is not merely an inert species.

These results appear counter intuitive for several reasons. First, the existing prior art of phosphor technology teaches that scandium additions are useful in stabilizing the recombination events that lead to very short duration phosphors such as occur in plasma screen technology applications. That is, scandium is taught as being used for improving the useful characteristics of short luminance durations. Further, scandium is a transition metal element, not a lanthanide rare earth element as taught in the prior art for photoluminescent materials. It therefore follows that because scandium possesses no f shell electrons, it is incapable of electron—hole reactions involving the $4f^7 \rightarrow 4f^6\ 5d^1$ states. The possible energy/charge transfer events due to the electron—hole transitions that arise from these states are taught in the prior art as being responsible for the long persistence afterglow phenomenon in strontium aluminate that is doped with europium and additional co-activators. Thus, the lanthanide rare earths have been taught as preferred co-activator elements because of their electronic similarity to the europium ion. The effect observed with scandium additions is therefore outside or beyond what the prior art teaches in obtaining a material having long and relatively bright afterglow characteristics.

Phosphors made according to the present invention demonstrate improved persistent phosphorescence intensity at long times subsequent to source extinction and therefore offer improve visibility for applications involving the use of long persistence phosphors. The present invention utilizes the addition of carefully controlled amounts of the element Sc generally in the form of $Sc_2O_3$, $ScCl_3$ or $ScFl_3$. In practice a preferred range for the Sc addition is 0.01 to about 3.0 mole persent.

While specific embodiments of the invention have been described in detail, it would be appreciated by those skilled in the art that various modifications and alternations would be developed in light of the overall teachings of the disclosure. For example, the tube can be a solid rod rather than a hollow cylindrical member. Accordingly, the particular arrangements disclosed are meant to be illustrative only and not limiting as to the scope of the invention, which is to be given the full breath of the appended claims and any and all equivalents thereof.

What is claimed is:

1. A photoluminescent aluminate comprising $SrAl_2O_4$:Eu, Dy,Gd,Sc wherein the following materials and quantities are combined and reacted to form the aluminate:
$SrCO_3$ (1.0 mole)
$Al_2O_3$ (1.0 mole)
$Eu_2O_3$ (0.005 mole)
$Dy_2O_3$ (0.01 mole)
$Gd_2O_3$ (0.005 mole)
$Sc_2O_3$ (0.005 mole)
$B_2O_3$ (0.2 mole).

2. A photoluminescent aluminate as recited in claim 1, wherein said $SrCO_3$ and $Al_2O_3$ are combined and reacted to form $SrAl_2O_4 + CO_2$.

3. A photoluminescent aluminate as recited in claim 2, where said $SrAl_2O_4$ is synthesized at approximately 1300° C.–1450° C.

* * * * *

UNITED STATES PATENT AND TRADEMARK OFFICE
CERTIFICATE OF CORRECTION

PATENT NO. : 6,969,475 B2
DATED : November 29, 2005
INVENTOR(S) : Robert W. Hyland, Jr. et al.

It is certified that error appears in the above-identified patent and that said Letters Patent is hereby corrected as shown below:

<u>Title page,</u>
Item [57], ABSTRACT,
Line 3, change "alloyed" to -- doped --.

Signed and Sealed this

Tenth Day of January, 2006

JON W. DUDAS
*Director of the United States Patent and Trademark Office*